United States Patent
Liu et al.

(10) Patent No.: US 11,641,992 B2
(45) Date of Patent: May 9, 2023

(54) DUST COLLECTOR, VACUUM CLEANER, AND SELF-PROPELLED VACUUM CLEANER

(71) Applicant: Nidec Corporation, Kyoto (JP)

(72) Inventors: Chun-Hsien Liu, Kyoto (JP); Bo Yi Li, Kyoto (JP); Chih-Hsiang Chen, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 386 days.

(21) Appl. No.: 16/893,492

(22) Filed: Jun. 5, 2020

(65) Prior Publication Data
US 2020/0390306 A1   Dec. 17, 2020

(30) Foreign Application Priority Data

Jun. 14, 2019 (JP) .............................. JP2019-110895

(51) Int. Cl.
| A47L 9/10 | (2006.01) |
| B01D 46/76 | (2022.01) |
| A47L 9/20 | (2006.01) |
| A47L 9/00 | (2006.01) |

(52) U.S. Cl.
CPC ................. *A47L 9/20* (2013.01); *A47L 9/102* (2013.01); *B01D 46/76* (2022.01); *A47L 9/009* (2013.01)

(58) Field of Classification Search
CPC ............ A47L 9/20; A47L 9/102; A47L 9/009; A47L 9/22; A47L 9/106; A47L 9/108; A47L 9/149; A47L 2201/00; A47L 15/4208; B01D 46/76; B01D 46/0041; B01D 46/103; B01D 46/74; B01D 46/762; B01D 2273/30; B01D 2279/55

USPC ...................................... 15/352; 55/300, 304
See application file for complete search history.

(56) References Cited

U.S. PATENT DOCUMENTS

| 2005/0091784 A1* | 5/2005 | Bone .......................... A47L 9/20 15/344 |
| 2007/0000219 A1* | 1/2007 | Park ....................... B01D 46/76 55/300 |
| 2009/0282641 A1* | 11/2009 | Black ....................... A47L 11/24 55/300 |
| 2015/0040342 A1* | 2/2015 | Henderson ................ A47L 5/32 15/363 |
| 2020/0390303 A1* | 12/2020 | Liu ........................ A47L 9/1409 |

FOREIGN PATENT DOCUMENTS

| CN | 107970692 A | * | 5/2018 | ......... B01D 46/0023 |
| CN | 108968804 A | * | 12/2018 | ........... A47L 9/1675 |
| EP | 1776912 A2 | * | 4/2007 | ............. A47L 9/122 |
| JP | 58-004526 A | | 1/1983 | |
| JP | 2004-129989 A | | 4/2004 | |
| JP | 2004-174042 A | | 6/2004 | |
| JP | 2007-029204 A | | 2/2007 | |

* cited by examiner

*Primary Examiner* — David Redding
*Assistant Examiner* — Michael A Gump
(74) *Attorney, Agent, or Firm* — Keating & Bennett

(57) ABSTRACT

A dust collector including a body with an intake portion and an exhaust portion includes a filter, a filter support that supports the filter, a motor case protruding from an inner surface of the body, and a vibration motor accommodated in the motor case. The body accommodates the filter support. A portion on the tip side of the motor case is at a position where it is allowed to come into contact with the filter support when the vibration motor is driven.

7 Claims, 5 Drawing Sheets

DUST COLLECTOR, VACUUM CLEANER, AND SELF-PROPELLED VACUUM CLEANER

CROSS REFERENCE TO RELATED APPLICATION

The present application claims priority under 35 U.S.C. § 119 to Japanese Application No. 2019-110895 filed on Jun. 14, 2019 the entire contents of which are hereby incorporated herein by reference.

FIELD OF THE INVENTION

The present disclosure relates to a dust collector, a vacuum cleaner, and a self-propelled vacuum cleaner.

BACKGROUND

A vacuum cleaner having a dust collector that collects dust contained in sucked air with a filter is known. For example, the vacuum cleaner has a detachable dust collecting unit. The dust collecting unit has a filter unit that collects sucked dust, and a dust accumulation unit in which dust is accumulated.

When the filter unit is clogged with dust during use of the vacuum cleaner, the airflow hardly passes through the filter unit. Therefore, the vacuum cleaner has a dust removing means for removing dust adhering to the filter unit. The dust removing means transmits vertical vibration of a magnet, provided with a certain space to the coil part, to the filter unit extending vertically, or wipes the filter surface with a dust removing lever.

However, the dust adhering to the filter unit may not be sufficiently removed by the vibration transmitted from the dust removing means to the filter unit, and it is desired to further increase the vibration of the filter unit. Moreover, wiping the filter surface may shorten the life of the filter unit.

SUMMARY

A dust collector according to an example embodiment of the present disclosure includes a body provided with an intake portion and an exhaust portion. The dust collector further includes a filter, a filter support that supports the filter, a motor case protruding from an inner surface of the body, and a vibration motor accommodated in the motor case. The body accommodates the filter support. A portion on the tip side of the motor case is at a position where it can come into contact with the filter support when the vibration motor is driven.

The above and other elements, features, steps, characteristics and advantages of the present disclosure will become more apparent from the following detailed description of the example embodiments with reference to the attached drawings.

DETAILED DESCRIPTION

Hereinafter, example embodiments will be described with reference to the drawings.

In the present specification, in the positional relationship between any one of orientation, a line, and a plane and another one, "parallel" means not only a state where the two never meet no matter how long they extend, but also a state where they are substantially parallel to each other. The terms "vertical" and "orthogonal" include not only a state where they intersect at 90 degrees with each other, but also a state where they are substantially vertical and a state where they are substantially orthogonal. That is, "parallel", "vertical", and "orthogonal" each include a state where the positional relationship between them has an angle deviation that does not depart from the gist of the present disclosure.

In this specification, a surface F to be cleaned is parallel to a horizontal plane. The direction from the surface F to be cleaned to a dust collector 111 is "vertically upward", and the direction from the dust collector 111 to the surface F to be cleaned is "vertically downward".

The matters described above are not strictly applied when incorporated in an actual device.

Figure 1:
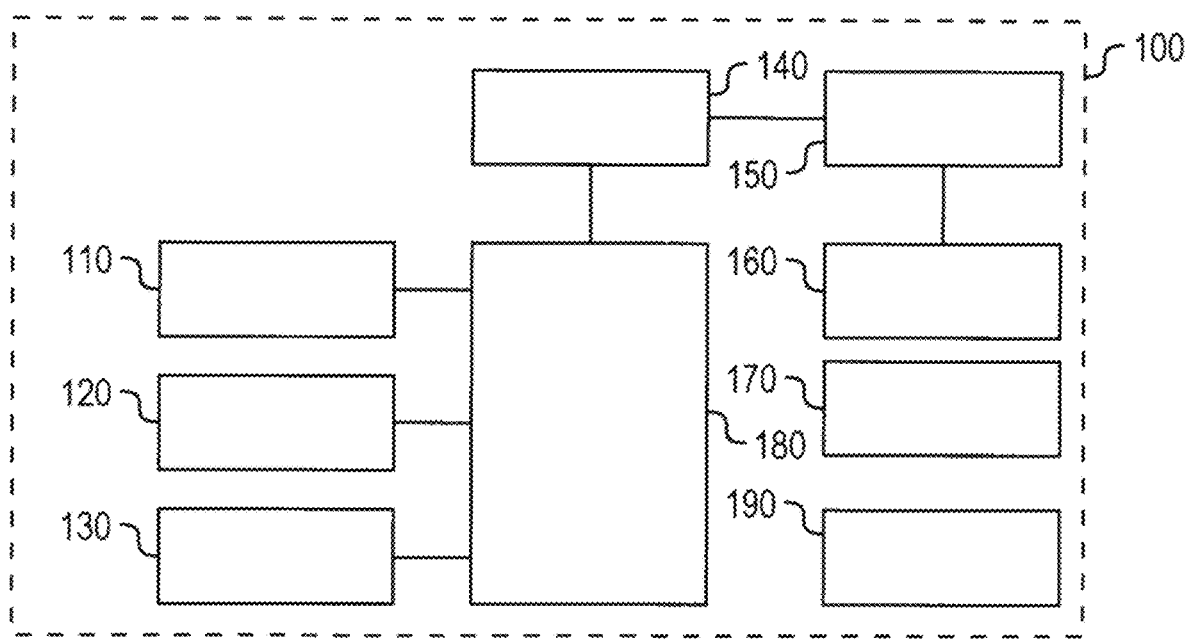
FIG. 1 is a block diagram illustrating an example configuration of a self-propelled vacuum cleaner according to an example embodiment of the present disclosure.
Figure 2:
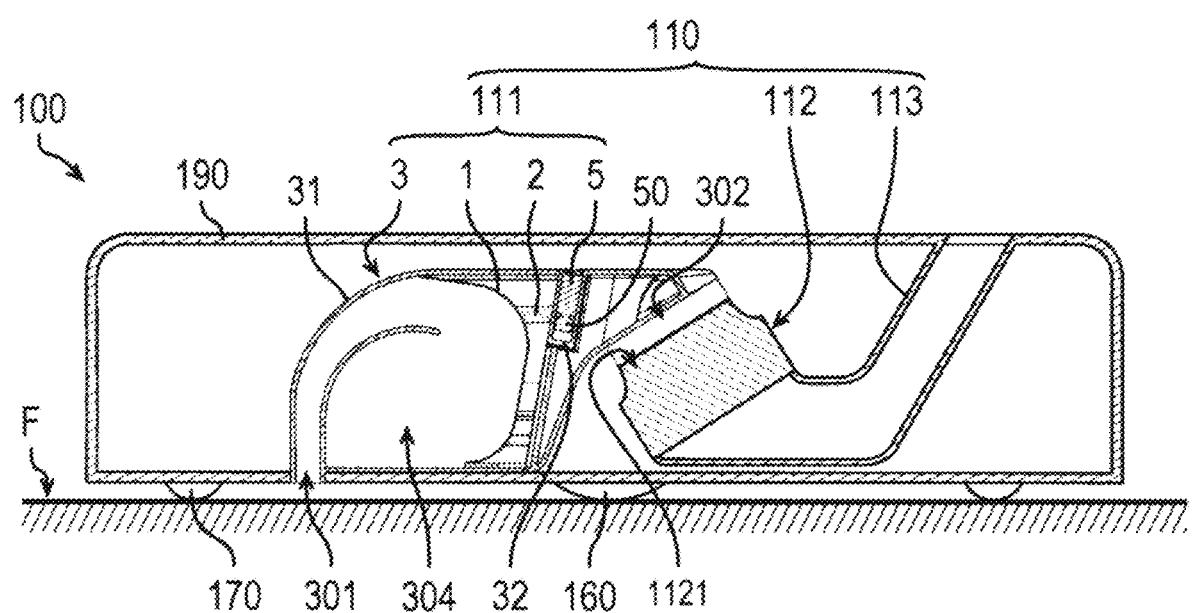
FIG. 2 is a cross-sectional view of a self-propelled vacuum cleaner according to an example embodiment of the present disclosure.

FIG. 1 is a block diagram illustrating an exemplary configuration of a self-propelled vacuum cleaner 100 according to the present example embodiment. FIG. 2 is a cross-sectional view of the self-propelled vacuum cleaner 100 according to the present example embodiment. In FIG. 1, electrically connected portions are schematically connected by solid lines, but these do not represent actual physical connection relationships. In FIG. 2, the self-propelled vacuum cleaner 100 is placed on the surface F to be cleaned.

The self-propelled vacuum cleaner 100 according to the present example embodiment is a so-called cleaning robot. The self-propelled vacuum cleaner 100 is capable of performing self-propelled cleaning on the surface F to be cleaned, for example.

The self-propelled vacuum cleaner 100 includes a vacuum cleaner 110, a sensor unit 120, a power supply unit 130, a drive unit 140, a motor unit 150, a main driving wheel 160, a driven wheel 170, a control unit 180, and a casing 190.

The vacuum cleaner 110 sucks and collects dust on the surface F to be cleaned together with air, for example. The vacuum cleaner 110 has a dust collector 111 and a blower 112. In the present example embodiment, the vacuum cleaner 110 also has an exhaust nozzle 113. That is, the self-propelled vacuum cleaner 100 includes the dust collector 111 and the blower 112. Thus, in the self-propelled vacuum cleaner 100 and the vacuum cleaner 110, a filter 1 in the dust collector 111 is efficiently vibrated as a whole so that dust is efficiently removed from the filter 1, whereby clogging or the like can be eliminated. The dust collector 111 sucks air with an intake portion 301 described later, and separates dust from the flow of the air. The separated air is discharged from an exhaust portion 302 described below to the outside of the dust collector 111. The blower 112 and the exhaust nozzle 113 are connected downstream of the dust collector 111. The blower 112 is connected to the exhaust portion 302, and generates a flow of air from the intake portion 301 to the exhaust portion 302 through the filter 1, described later, in the dust collector 111. Further, the blower 112 generates a negative pressure in the exhaust portion 302 to suck the air in the dust collector 111, and discharges the air to the outside of the vacuum cleaner 110 through the exhaust nozzle 113. As the blower 112, an axial fan is employed in the present example embodiment. However, the present disclosure is not limited to this example, and other types of fans such as a centrifugal fan may be employed.

The sensor unit 120 is, for example, an infrared sensor, and detects obstacles such as walls and furniture, steps, and the like. The power supply unit 130 is, for example, a secondary battery, and supplies power to each component of the self-propelled vacuum cleaner 100. The drive unit 140 controls driving of the motor unit 150. The motor unit 150 is a driving device that drives the main driving wheel 160. The main driving wheel 160 is a wheel that causes the self-propelled vacuum cleaner 100 to travel together with the driven wheel 170. The control unit 180 controls each component of the self-propelled vacuum cleaner 100. The casing 190 accommodates therein the vacuum cleaner 110, the sensor unit 120, the power supply unit 130, the drive unit 140, the motor unit 150, the control unit 180, and the like.

Figure 3:
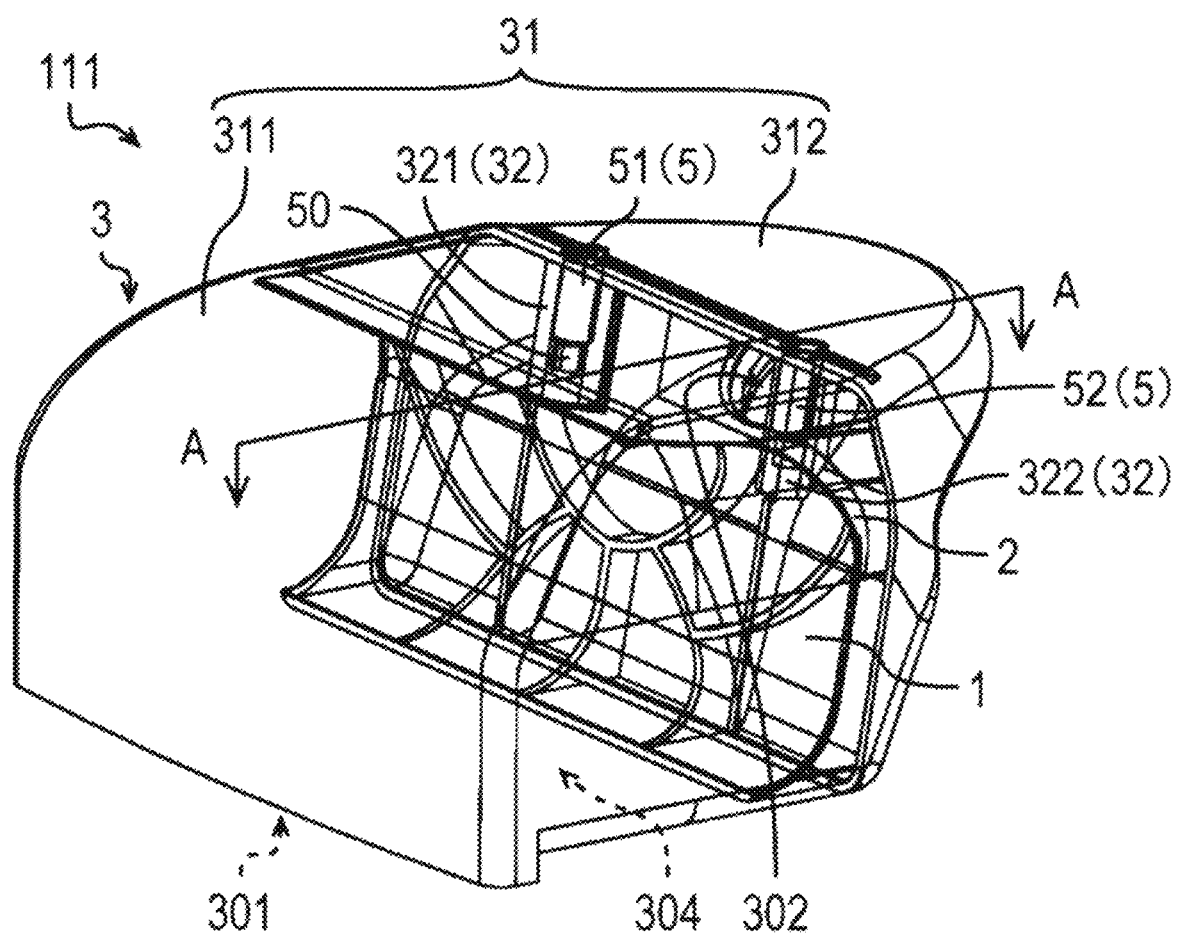
FIG. 3 is a transparent perspective view of a dust collector according to an example embodiment of the present disclosure.
Figure 4:
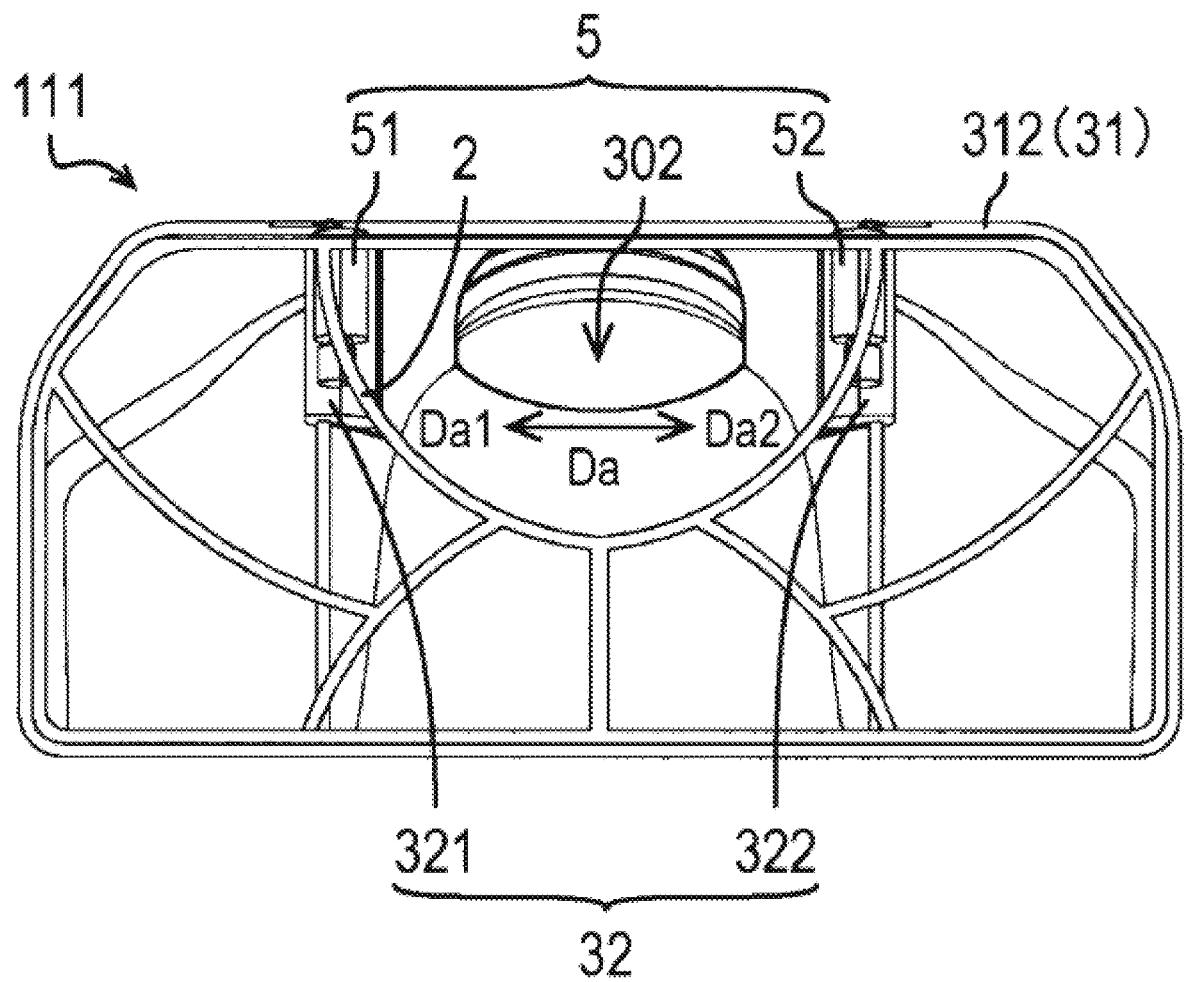
FIG. 4 is a front view of the dust collector as viewed from the intake portion side.
Figure 5:
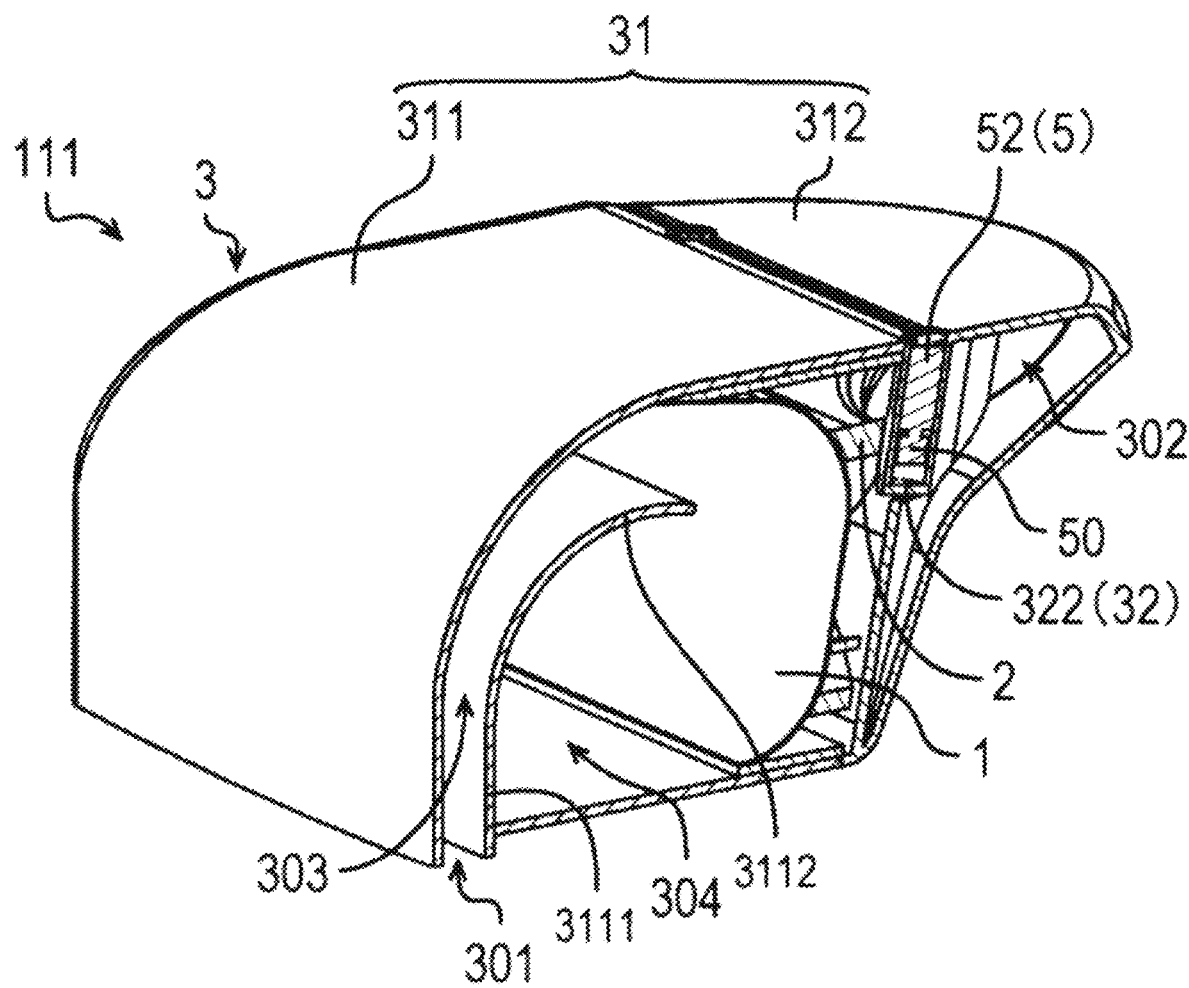
FIG. 5 is a sectional perspective view of the dust collector.

Next, configuration of the dust collector 111 will be described with reference to FIGS. 2 to 5. FIG. 3 is a transparent perspective view of the dust collector 111 according to the present example embodiment. FIG. 4 is a front view of the dust collector 111 as viewed from the intake portion 301 side. FIG. 5 is a sectional perspective view of the dust collector 111. Note that FIGS. 3 to 5 show the dust collector 111 of the self-propelled vacuum cleaner 100 placed on the surface F to be cleaned. Further, in FIG. 3, the filter 1, a filter support 2, a first body 311, a motor case 32, and the like, which will be described later, are shown in a transparent manner so that the internal structure of the dust collector 111 can be easily understood. Further, in FIG. 4, illustration of the first body 311 and the filter 1, which will be described later, is omitted so that the arrangement of the motor case 32 and a vibration motor 5 can be easily understood. FIG. 5 shows a cross-sectional structure of the dust collector 111 taken along line A-A in FIG. 3.

The dust collector 111 includes the filter 1, the filter support 2, a housing 3, and the vibration motor 5.

The filter 1 has air permeability and collects dust contained in an airflow passing through the filter 1. The vacuum cleaner 110 has the filter 1. As the filter 1, for example, a high efficiency particular air filter (HEPA filter) can be adopted.

The filter support 2 supports the filter 1.

The housing 3 houses the filter 1 and the filter support 2. The housing 3 has a body 31 and the motor case 32. In other words, the dust collector 111 further includes the body 31 and the motor case 32.

The body 31 accommodates the filter support 2. The body 31 is provided with an intake portion 301 and an exhaust portion 302. That is, the dust collector 111 includes the body 31 provided with the intake portion 301 and the exhaust portion 302. The intake portion 301 is an opening for taking in the air from the outside of the housing 3. The exhaust portion 302 is linked to the intake portion 301 via the filter 1. The exhaust portion 302 is an opening for exhausting the air to the outside of the housing 3, and is linked to the intake portion 301 via the filter 1. In the present example embodiment, a suction port 1121 of the blower 112 is connected to the exhaust portion 302.

The body 31 has the first body 311 provided with the intake portion 301 and a second body 312 provided with the exhaust portion 302.

The first body 311 is provided detachably from the second body 312. The filter 1 and the filter support 2 are detachably mounted inside the first body 311. The first body 311 can be taken out of the self-propelled vacuum cleaner 100.

Inside the first body 311, an intake passage 303 and a dust collection chamber 304 are provided. One end of the intake passage 303 is linked to the outside of the self-propelled vacuum cleaner 100 via the intake portion 301. The other end of the intake passage 303 is linked to the dust collection chamber 304. The dust collection chamber 304 is provided upstream of the filter 1 on the intake portion 301 side. In the dust collection chamber 304, at least part of the dust separated from the airflow by the filter 1 is accumulated.

Further, the first body 311 has a partition wall 3111 and a guide plate 3112. The partition wall 3111 extends from a part of the peripheral edge of the intake portion 301, and separates the intake passage 303 from the dust collection chamber 304. The guide plate 3112 extends from the tip of the partition wall 3111 to the inside of the dust collection chamber 304. The guide plate 3112 guides the airflow flowing through the intake passage 303 to a surface of the filter 1 on the intake portion 301 side.

Next, the motor case 32 is cylindrical and accommodates the vibration motor 5. That is, the vibration motor 5 is accommodated in the motor case 32. The motor case 32 protrudes from the inner surface of the body 31. In the present example embodiment, the motor case 32 protrudes downward from a top surface of the inner surfaces of the second body 312. Note that the present disclosure is not limited to the example of the present example embodiment, and the motor case 32 may protrude upward from a bottom surface of the inner surfaces of the second body 312. Alternatively, the motor case 32 may protrude from a side surface of the inner surfaces of the second body 312 in a direction intersecting the vertical direction. That is, the motor case 32 is disposed in a cantilever shape in which a root portion of the motor case 32 is connected to an inner surface of the body 31 as a fixed end. The tip of the motor case 32 is a free end. In this way, a portion on the tip side of the motor case 32 can be vibrated more largely by the vibration of the vibration motor 5.

A portion on the tip side of the motor case 32 is disposed at a position where it can come into contact with the filter support 2 when the vibration motor 5 is driven. In this way, when the vibration motor 5 is driven, the portion on the tip side of the motor case 32 comes into contact with the filter support 2 and can hit the filter support 2. Therefore, since the filter support 2 can be vibrated largely, the entire filter 1 can be efficiently vibrated, and the efficiency of removing dust from the filter 1 can be improved. Therefore, clogging of the filter 1 can be eliminated.

Preferably, a plurality of motor cases 32 are provided. In the present example embodiment, as shown in FIGS. 3 and 4, the number of the motor cases 32 is two. More specifically, the motor case 32 includes a first motor case 321 and a second motor case 322. However, the motor case 32 is not limited to the examples shown in FIGS. 3 and 4 and may be one. Alternatively, the number of the motor cases 32 provided inside the body 31 may be three or more.

The portions on the tip sides of the respective motor cases 32 are disposed at positions separated from each other. This allows the filter support 2 to vibrate more strongly between the positions where the respective motor cases 32 hit the filter support 2. For example, as shown in FIG. 4, by disposing the portions on the tip sides of the motor cases 32 at one end side and the other end side of the filter 1 in a predetermined direction, stronger vibration can be generated in the filter support 2 in a wider range from one end side to the other end side of the filter 1 in the predetermined direction.

In FIG. 4, the portions on the tip sides of the first motor case 321 and the second motor case 322 are respectively arranged in an arrangement direction Da parallel to a horizontal plane and to a surface on the exhaust portion 302 side of the filter 1. The portion on the tip side of the first motor case 321 is disposed at a position where it can come into contact with a portion on the one Da1 side in the arrangement direction of the filter support 2 when the first vibration motor 51, described later, accommodated in the first motor case 321 is driven. The portion on the tip side of the second motor case 322 is disposed at a position where it can come into contact with a portion on the other Da2 side in the arrangement direction of the filter support 2 when the second vibration motor 52, described later, accommodated in the second motor case 322 is driven. With such an arrangement, stronger vibration can be generated in the filter support 2 in a wider range from the one Da1 side in the arrangement direction to the other Da2 side in the arrangement direction.

Note that the portions on the tip sides of the respective motor cases 32 are preferably disposed as far away from each other as possible. For example, the motor case 32 disposed at one farthest end in the direction in which a plurality of motor cases 32 are arranged may be disposed at a position where it can come into contact with the edge on one direction side in the direction in which the filter support 2 is disposed, when the vibration motor 5 accommodated in the motor case 32 is driven. Meanwhile, the motor case 32 disposed at the other farthest end side may be disposed at a position where it can come into contact with the edge on the other side in the above direction in which the filter support 2 is disposed, when the vibration motor 5 accommodated in the motor case 32 is driven. For example, in FIG. 4, the portion on the tip side of the first motor case 321 may be disposed at a position where it can come into contact with the one Da1 side in the arrangement direction of the filter support 2, when the first vibration motor 51 is driven. Meanwhile, the portion on the tip side of the second motor case 322 may be disposed at a position where it can come into contact with the edge on the other Da2 side in the arrangement direction of the filter supports 2, when the second vibration motor 52 is driven. In this way, stronger vibration can be generated in the filter support 2 in a wider range.

It is preferable that the motor case 32 is disposed closer to the exhaust portion 302 than the filter support 2, as shown in FIGS. 2 to 5. With this configuration, the exhaust portion 302 side of the filter support 2 can be hit by the portion of the tip side of the motor case 32, so that larger vibration can be transmitted to the surface of the filter 1 on the exhaust portion 302 side. Since the air flows from the intake portion 301 to the exhaust portion 302 through the filter 1 by the blower 112, a larger amount of dust adheres to the surface of the filter 1 on the intake portion 301 side than the surface of the filter 1 on the exhaust portion 302 side. In addition, clogging is likely to occur on the surface on the intake portion 301 side of the filter 1. In the housing 3, since the motor case 32 accommodating the vibration motor 5 is disposed closer to the exhaust portion 302 than the filter support 2, a larger amount of dust adhering to the surface on the intake portion 301 side of the filter 1 can be removed. Therefore, dust can be more efficiently removed from the filter 1, so that clogging and the like can be more easily eliminated.

Next, the vibration motor 5 has a vibrator 50. More specifically, the vibration motor 5 includes a motor unit (reference numeral is omitted) and the vibrator 50 that can vibrate by the driving of the motor unit. The vibrator 50 is disposed on the tip side in the motor case 32. Therefore, the amplitude of a portion on the tip side of the motor case 32 can be further increased. In the present example embodiment, the vibration motor 5 is, for example, an eccentric motor. The vibrator 50 is an eccentric weight having its center of gravity at a position radially away from the rotation axis of the motor unit. The rotation axis of the motor unit is parallel to the direction in which the motor case 32 extends. When the motor unit rotates the eccentric weight about the rotation axis, the vibration motor 5 vibrates in a direction perpendicular to the direction in which the motor case 32 extends.

Preferably, a plurality of vibration motors 5 are provided. In the present example embodiment, as shown in FIGS. 3 and 4, the number of vibration motors 5 is two that is the same as the number of the motor cases 32. More specifically, the vibration motor 5 includes a first vibration motor 51 accommodated in the first motor case 321 and a second vibration motor 52 accommodated in the second motor case 322.

Further, in the present example embodiment, one vibration motor 5 is accommodated in each of the motor cases 32. However, the present disclosure is not limited to this example, and a plurality of vibration motors 5 may be accommodated in at least one motor case 32. That is, the number of vibration motors 5 may be more than the number of the motor cases 32. Further, at least one vibration motor 5 may be accommodated in each of the motor cases 32. In this way, larger vibration can be generated in the filter support 2 and transmitted to the filter 1.

When a plurality of vibration motors are accommodated in one motor case 32, it is preferable that respective vibration motors 5 vibrate in the same phase. In this way, the vibrations of the same phase interfere with each other, so that the amplitude of the portion on the tip side of the motor case 32 can be further increased.

However, the present disclosure is not limited to this example, and the respective vibration motors 5 accommodated in one motor case 32 may vibrate in different phases. In that case, it is preferable that in the motor case 32, the respective vibration motors 5 are provided apart from each other in a direction perpendicular to the direction in which the motor case 32 extends. With this configuration, the portion on the tip side of the motor case 32 vibrates while being twisted. Therefore, it is possible to hit the filter support 2 with the portion on the tip side of the motor case 32, while suppressing a decrease in the vibration amplitude in the portion on the tip side of the motor case 32 due to interference of vibrations of different phases.

Each vibration motor 5 vibrates at a vibration frequency lower than the primary natural frequency of the motor case 32 accommodating the vibration motor 5. More specifically, each vibration motor 5 vibrates at a vibration frequency lower than the primary natural frequency in a state where the vibration motor 5 is accommodated. As a result, the portion on the tip side of the motor case 32 vibrates at a vibration frequency lower than the primary natural frequency described above. The vibration amplitude when the vibration frequency is higher than the primary natural frequency is likely to be smaller than the vibration amplitude when the vibration frequency is lower than the primary natural frequency. This tendency becomes stronger as the vibration frequency is apart from the primary natural frequency. Therefore, by setting the vibration frequency of the vibration, generated in the motor case 32 by the vibration motor 5, to be lower than the primary natural frequency of the motor case 32, the vibration generated in the motor case 32 can be efficiently transmitted to the filter support 2.

Further, among the vibration motors 5, it is preferable that the vibration frequency of some vibration motors 5 is different from the vibration frequency of the other vibration motors 5. In this way, by causing the vibration of the filter support 2 to undulate, it is possible to remove dust from the filter 1 more efficiently over a wide area, and eliminate clogging or the like of the filter 1 more effectively.

More specifically, it is preferable that the vibration frequencies of the vibration motors 5 accommodated in the motor cases 32 in which the portions on the tip sides are arranged at different positions differ in the respective motor cases 32. For example, in FIG. 4, in the arrangement direction Da of the two motor cases 32, the vibration frequency of the first vibration motor 51 accommodated in the first motor case 321 on one Da1 side in the arrangement direction differs from the vibration frequency of the second vibration motor 52 accommodated in the second motor case 322 on the other Da2 side in the arrangement direction. In this way, it is possible to cause the vibration of the filter support 2 to undulate between the positions where the respective motor cases 32 hit the filter support 2. Further, the position where the amplitude of the vibration, generated in the filter support 2 and transmitted to the filter 1 due to a contact by each motor case 32, is maximized changes over time. Therefore, dust can be more efficiently removed from the filter 1 over a wide range, and clogging and the like can be more effectively eliminated.

Further, when a plurality of motor cases 32 are arranged side by side in a predetermined direction, the vibration frequency of the vibration motor 5 accommodated in one of the motor cases 32 adjacent in the predetermined direction may differ from the vibration frequency of the vibration motor 5 accommodated in the other one. In this way, between the respective positions where the motor cases 32 adjacent to each other in the direction in which the motor cases 32 are arranged hit the filter support 2, the vibration of the filter support 2 can be caused to undulate, and the position at which the amplitude of the vibration is maximized can be changed over time.

Further, when a plurality of vibration motors 5 are accommodated at positions away from each other in one motor case 32, it is preferable that the vibration frequency of some vibration motors 5 in the same motor case 32 differs from the vibration frequency of other vibration motors 5. In this way, the portion on the tip side of the motor case 32 vibrates while being undulated, and can hit the filter support 2. Alternatively, the maximum vibration amplitude at the free end of the motor case 32 in which these vibration motors 5 are accommodated can be changed over time, according to the overlap of different vibration frequencies of some vibration motors 5 and other vibration motors 5. Therefore, undulation can be generated in the vibration of the filter support 2.

The difference between the maximum vibration frequency and the minimum vibration frequency, among the vibration frequencies of respective vibration motors 5, is preferably 1% or more and 10% or less of the maximum vibration frequency. In this way, between the position where the motor case 32 accommodating the vibration motor 5 that vibrates at the maximum vibration frequency hits the filter support 2 and the position where the motor case 32 accommodating the vibration motor 5 that vibrates at the minimum vibration frequency hits the filter support 2, resonance vibration having a sufficiently large amplitude can be obtained, whereby sufficient undulation can be generated in the vibration of the filter support 2. Note that when the difference between the maximum vibration frequency and the minimum vibration frequency is less than 1% of the maximum vibration frequency, the frequency of undulation generated in the vibration of the filter support 2 becomes low, and a change of the position where the amplitude of the vibration in the filter support 2 becomes the maximum delays. Therefore, it takes longer time to remove dust from the filter 1. Moreover, when the difference between the maximum vibration frequency and the minimum vibration frequency exceeds 10% of the maximum vibration frequency, the frequency of undulation generated in the vibration of the filter support 2 becomes extremely high, and a change of the position where the amplitude of the vibration in the filter support 2 becomes the maximum is too fast. Therefore, before the dust can be sufficiently removed from the filter 1, the position where the amplitude of the vibration becomes the maximum in the filter support 2 changes. Accordingly, it is difficult to increase the efficiency of removing dust from the filter 1.

It is preferable that the motor case 32 accommodating the vibration motor 5 that vibrates at the maximum vibration frequency and the motor case 32 accommodating the vibration motor 5 that vibrates at the minimum vibration frequency are disposed as far away from each other as possible. For example, when a plurality of motor cases 32 are disposed side by side in a predetermined direction, the motor case 32 accommodating the vibration motor 5 that vibrates at the maximum vibration frequency is preferably disposed on one farthest side in the predetermined direction. The motor case 32 accommodating the vibration motor 5 that vibrates at the minimum vibration frequency is preferably disposed on the other farthest side in the predetermined direction. In this way, in the predetermined direction in which the motor cases 32 are arranged, undulation sufficient for vibration of the filter support 2 can be generated in a wider range.

Note that the vibration frequency is not limited to that of the above example, and vibration frequencies of all of the vibration motors 5 may be the same. For example, the vibration frequencies of the vibration motors 5 accommodated in the respective motor cases 32 whose portions on the tip sides thereof are disposed at different positions may all be the same. Further, the vibration frequencies of all of the vibration motors 5 accommodated in one motor case 32 may be the same.

The present disclosure is useful for, for example, a device that collects dust from an airflow with a filter.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A dust collector, comprising:
   a body provided with an intake portion and an exhaust portion;
   a filter;
   a filter support that supports the filter;
   a plurality of motor cases protruding from an inner surface of the body; and
   a plurality of vibration motors accommodated in the plurality of motor cases; wherein each of the plurality of motor cases accommodates at least one of the plurality of vibration motors;

the body accommodates the filter support;

a portion at a tip side of the plurality of motor cases is at a position where the portion is allowed to come into contact with the filter support when the plurality of vibration motors are driven;

a vibration frequency of some of the plurality of vibration motors is different from a vibration frequency of others of the plurality of vibration motors; and a difference between a maximum vibration frequency and a minimum vibration frequency among the vibration frequencies of the plurality of vibration motors is 1% or more and 10% or less of the maximum vibration frequency.

2. The dust collector according to claim 1, wherein each of the plurality of vibration motors includes a vibrator; and the vibrator is on the tip side in the plurality of motor cases.

3. The dust collector according to claim 1, wherein the portions on the tip sides of the plurality of motor cases are respectively provided at positions separated from each other.

4. The dust collector according to claim 1, wherein the plurality of vibration motors respectively vibrate at the vibration frequency lower than a primary natural frequency of the plurality of motor cases that accommodate the plurality of vibration motors.

5. The dust collector according to claim 1, wherein the exhaust portion is linked to the intake portion via the filter; and the plurality of motor cases is between the exhaust portion and the filter support.

6. A vacuum cleaner comprising:

the dust collector according to claim 1; and a blower that is connected to the exhaust portion and generates a flow of air from the intake portion toward the exhaust portion through the filter in the dust collector.

7. A self-propelled vacuum cleaner, comprising:

the dust collector according to claim 1; and a blower that is connected to the exhaust portion and generates a flow of air from the intake portion toward the exhaust portion through the filter in the dust collector;

wherein the self-propelled vacuum cleaner is capable of performing self-propelled cleaning on a surface to be cleaned.

* * * * *